Figure 1:
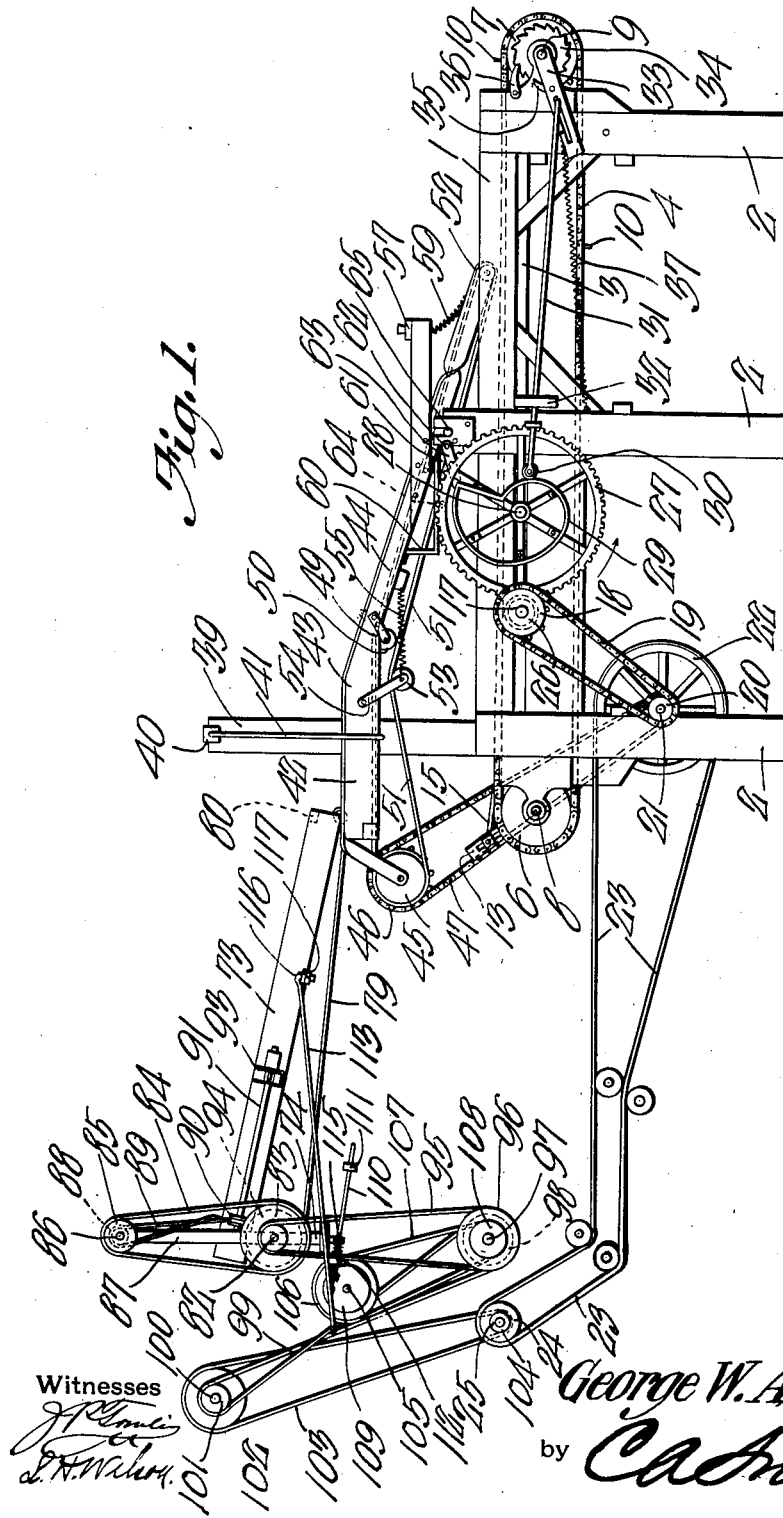

G. W. ALLEN.
FRUIT SPREADING MACHINE.
APPLICATION FILED OCT. 11, 1911.

1,033,076.

Patented July 23, 1912.

4 SHEETS—SHEET 1.

Witnesses

George W. Allen, Inventor by C. A. Snow & Co., Attorneys

G. W. ALLEN.
FRUIT SPREADING MACHINE.
APPLICATION FILED OCT. 11, 1911.

1,033,076.

Patented July 23, 1912.
4 SHEETS—SHEET 2.

Witnesses

George W. Allen Inventor
by C. A. Snow & Co.
Attorneys

G. W. ALLEN.
FRUIT SPREADING MACHINE.
APPLICATION FILED OCT. 11, 1911.
1,033,076.
Patented July 23, 1912.
4 SHEETS—SHEET 3.
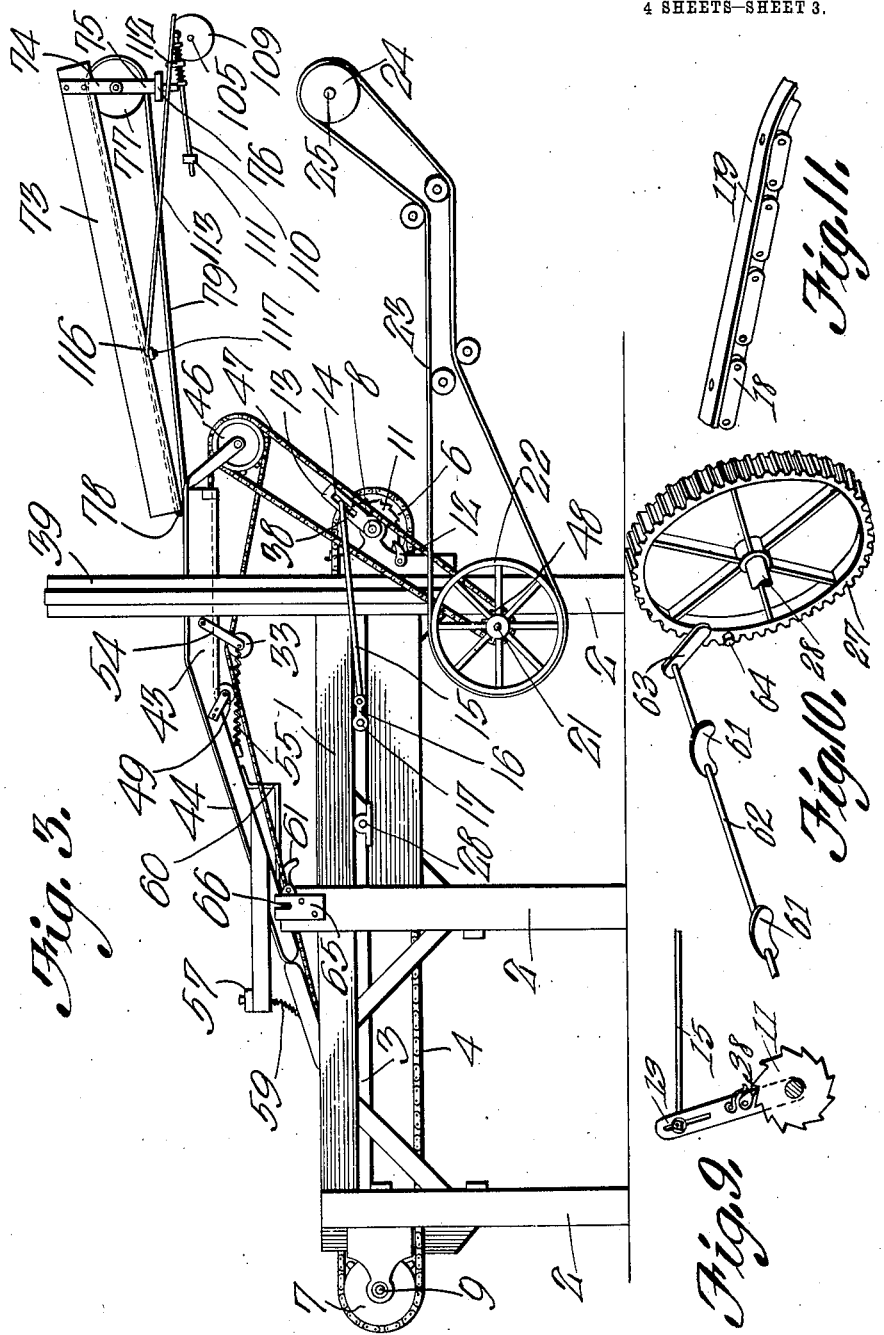
Witnesses
George W. Allen  Inventor
by C. A. Snow & Co.
Attorneys G. W. ALLEN.
FRUIT SPREADING MACHINE.
APPLICATION FILED OCT. 11, 1911.
1,033,076.
Patented July 23, 1912.
4 SHEETS—SHEET 4.
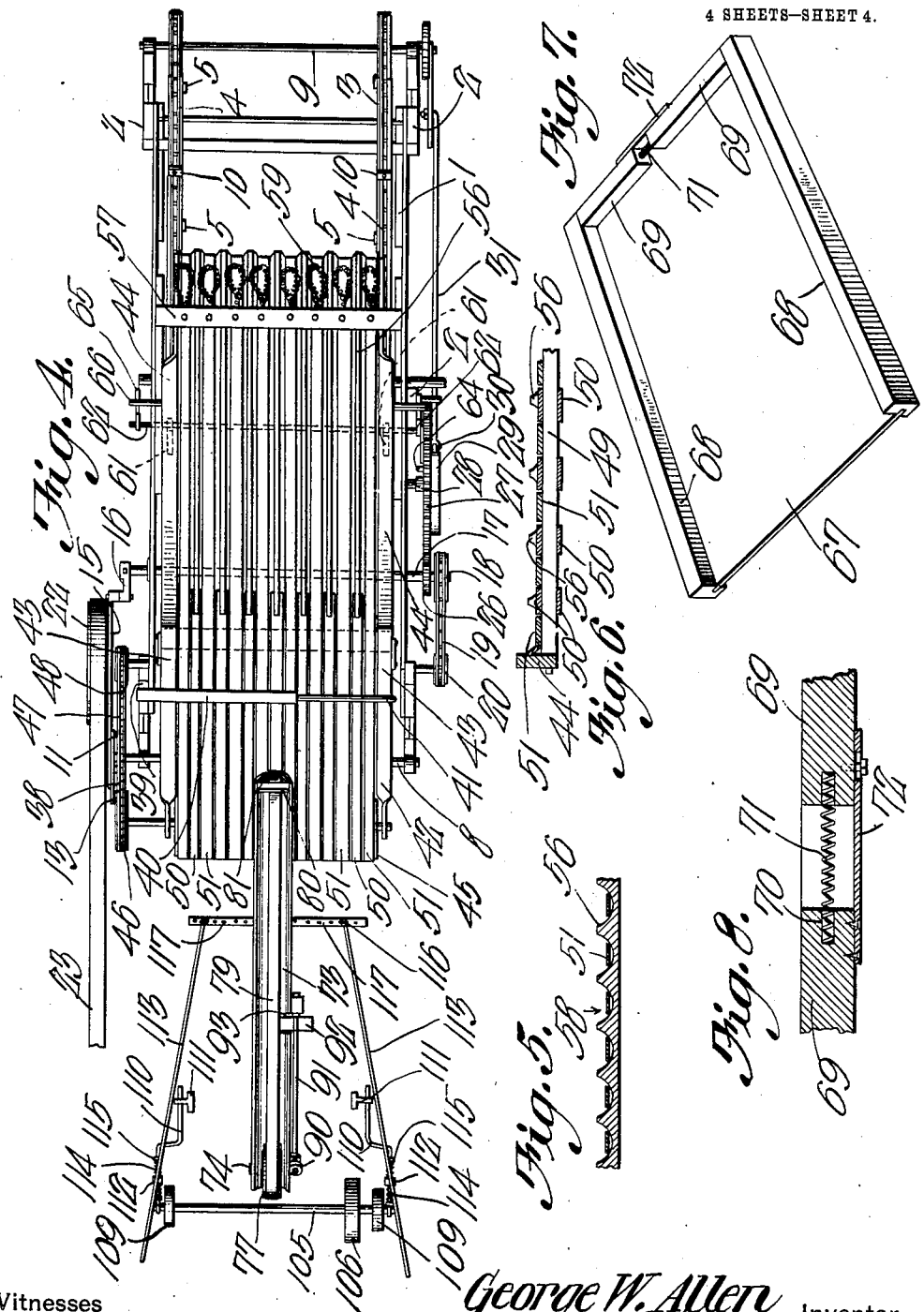
Witnesses
George W. Allen Inventor
by
Attorneys

UNITED STATES PATENT OFFICE.

GEORGE WILLIAM ALLEN, OF SELMA, CALIFORNIA.

FRUIT-SPREADING MACHINE.

1,033,076. Specification of Letters Patent. Patented July 23, 1912.

Application filed October 11, 1911. Serial No. 654,168.

*To all whom it may concern:*

Be it known that I, GEORGE W. ALLEN, a citizen of the United States, residing at Selma, in the county of Fresno and State of California, have invented a new and useful Fruit-Spreading Machine, of which the following is a specification.

This invention relates to machines for filling trays with cut fruit, one of the objects of the invention being to provide a machine of this character which will distribute the fruit evenly within the trays supplied to the machine and, in every instance, deposit the pieces of fruit in the tray with their cut or flat faces uppermost.

Another object is to provide a machine of this type which is adapted to fill trays such as commonly employed and without necessitating any changes in them.

A still further object is to provide improved means for feeding the trays automatically so as to receive the fruit delivered thereto, the mechanism for feeding the trays being adjustable so as to time the trays according to the sizes of the fruits used.

Another object is to provide improved means for turning the pieces of fruit so as to bring their flat or cut faces uppermost while the said pieces are passing toward the trays.

Another object is to provide a novel form of spreading table for directing the pieces of fruit into the trays, there being means for distributing them on the table to thus insure proper distribution of the pieces on the trays.

Another object is to provide means for automatically elevating the spreading table at those times when it is necessary for the ends of the trays to pass under the discharge end of the table, the tray feeding mechanism being adapted to accelerate the speed of the trays during this movement.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

Figure 2:
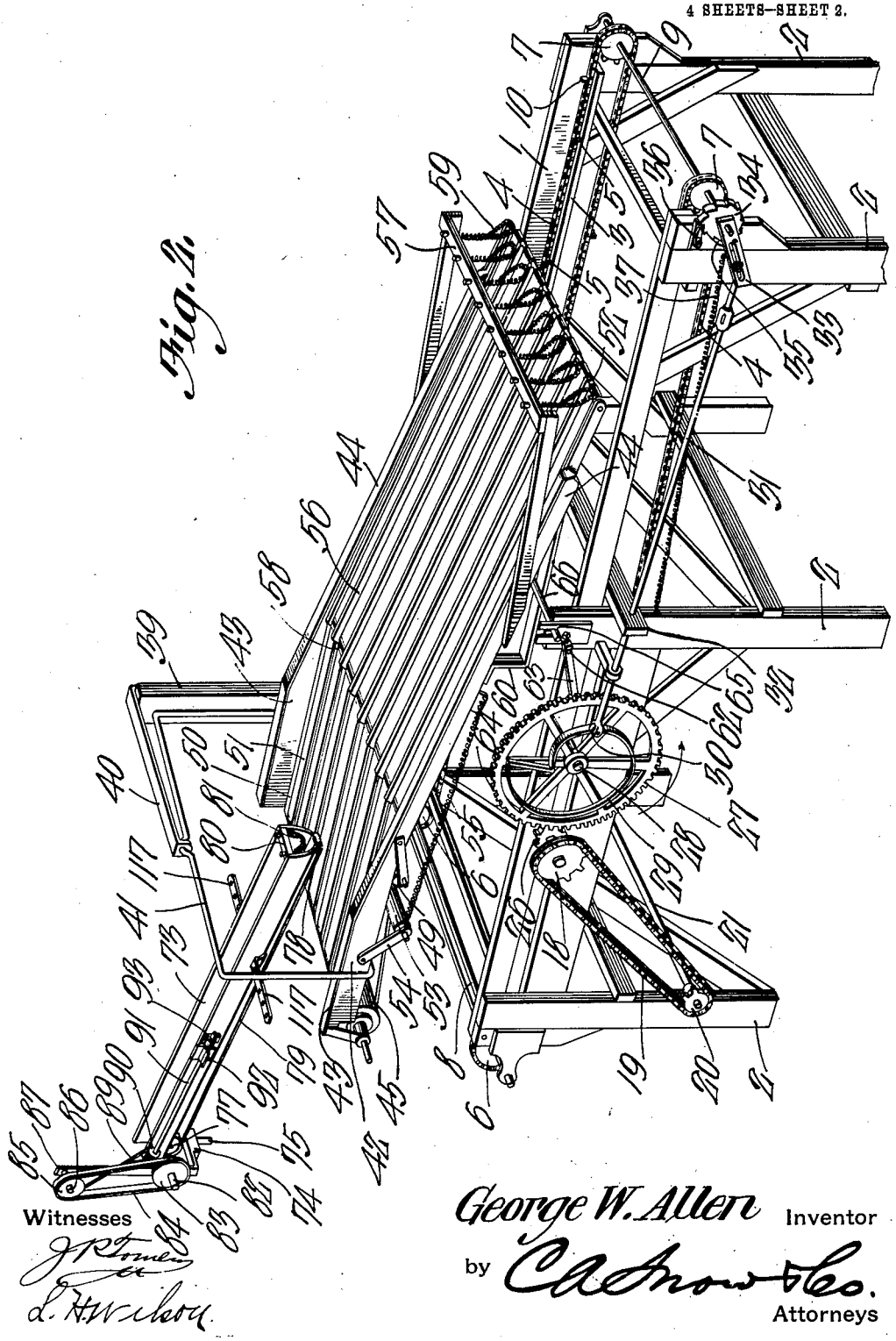

In said drawings:—Figure 1 is a side elevation of the complete apparatus. Fig. 2 is a perspective view thereof, parts of the driving mechanism being removed. Fig. 3 is an elevation of that side of the machine opposite the side shown in Fig. 1, parts of the driving mechanism being removed. Fig. 4 is a plan view of the machine. Fig. 5 is a transverse section through a portion of the inclined spreading table. Fig. 6 is a transverse section through a portion of the feed box of the spreading table. Fig. 7 is a perspective view of the tray to be used in connection with the machine. Fig. 8 is a horizontal section through a portion of one of the end cleats of the tray. Fig. 9 is an elevation of one of the ratchet wheels and the pawl for actuating the same, the shaft on which the wheel is mounted being shown in section. Fig. 10 is a perspective view of the cams and their operating mechanism. Fig. 11 is a perspective view of a portion of a modified form of belt.

Referring to the figures by characters of reference 1 designates the main frame of the machine, the same being supported by standards 2 or the like and arranged along the inner faces of the sides of the frame are guide cleats 3 supporting the upper runs of endless chains 4. Guide studs 5 or the like extend upwardly from the cleats and serve to prevent lateral displacement of the chains relative to the cleats.

Each chain is mounted upon sprockets 6 and 7, the sprockets 6 of the two chains being secured to a shaft 8 supported beyond the feed end of the frame 1 while the sprockets 7 of the chains are secured to a shaft 9 supported beyond the delivery end of the frame. Ears or followers 10 extend outwardly from the chains 4 and are adapted to engage and move trays provided for receiving fruit, as hereinafter set forth.

A ratchet wheel 11 is secured to one end portion of the shaft 8 and is held normally against rotation in one direction by means of a pawl 12. An arm 13 is pivotally mounted on the shaft 8 and close to the ratchet wheel 11, this arm being formed with a longitudinal slot 14 in which a pitman 15 is adjustably mounted. Said pitman is pivotally mounted on and adapted to be actuated by a crank 16 arranged at one end of a shaft 17. Said shaft extends transversely of and is journaled upon the frame 1 and is provided, at its opposite end, with a sprocket 18 receiving motion, through a chain 19, from a sprocket 20. This last mentioned sprocket is secured to a shaft 21 journaled upon the standards 2 at the receiving end of the apparatus and a pulley 22 is secured to the other end of shaft 21 and preferably receives motion through a belt 23 from a pulley 24 mounted on the drive shaft 25 of the apparatus. This drive shaft can be used solely for operating the parts constituting the present invention or can be a part of another machine such, for example, as a fruit cutter of the Marsch type.

A small gear 26 is secured to the shaft 17 close to the sprocket 18 and meshes with a large gear 27 mounted for rotation upon a fixed shaft 28. The gears 26 and 27 are preferably so proportioned that gear 27 will complete one revolution to every thirteen revolutions of the gear 26. A cam 29 rotates with the gear 27 and is engaged by a roller 30 located at one end of a rod 31 slidably mounted upon one side of the structure and within a guide 32. The front end of this rod is pivotally and adjustably connected to an arm 33 which is loosely mounted on the shaft 9. A ratchet wheel 34 is secured to the shaft 9 and a pawl 35 is carried by arm 33 and normally engages the ratchet wheel. A detent 36 engages said wheel so as to prevent it from turning backwardly. It will be apparent, however, that when arm 33 is swung in one direction, the pawl 35 carried thereby will rotate the ratchet wheel 34 and the shaft 9, the teeth of the ratchet wheel clicking under the detent 36. From the foregoing it will be seen that as the gear 27 rotates in the direction of the arrows, the arm 33 will be slowly swung downwardly and forwardly, thus causing the pawl 35 to slip over the teeth of the ratchet wheel. When, however, the outermost extremity of the cam passes the roller 30, a spring 37 which is connected to the arm 33, will promptly swing the arm 33 back to its initial position so as to bring the roller 30 into contact with the innermost portion of the cam 29. This return movement of arm 33 will result in the rotation of the ratchet wheel 34 by the pawl 35 and a quick movement of the sprockets 7 and the chains 4 engaging the same will thus be obtained.

Each rotation of the shaft 17 causes a back and forth movement of the arm 13 and this arm has a pawl 38 pivotally connected to it and normally engaging the ratchet wheel 11. Thus it will be seen that the upper runs of the chains 4 are moved forwardly intermittently by the oscillating arm 13 and the pawl carried thereby and that after the runs have been moved a predetermined distance, which is about equal to the length of a tray to be used in connection with the machine, a sudden quick movement of the chains in the same direction is effected by means of the cam 29, spring 37, and the parts coöperating therewith.

A standard 39 extends upwardly from one side of the frame 1 at the receiving end of the frame and has an arm 40 overhanging said frame and from which a yoke 41 is suspended. This yoke supports the feed box 42 of the spreading table. Said feed box is substantially horizontal and its upstanding side walls 43 merge into the downwardly and forwardly inclined side walls 44 of the inclined portion of the feed table.

A cylinder 45 is mounted under the receiving end of the feed box 42 and a sprocket 46 rotates with this cylinder and receives motion, through a chain 47, from a sprocket 48 secured to one end of the shaft 21. A roller 49 is supported under the discharge end of the feed box 42 and mounted on this roller and the cylinder 45 are endless belts 50 spaced apart so as to receive between them longer endless belts 51 which are mounted on the cylinder 45 and have their upper runs mounted on the roller 49. These last mentioned belts also extend with their upper runs inclined downwardly and forwardly so as to form the bottom of the inclined portion of the spreading table. The lowermost portions of the belts 51 are mounted on a roller 52 arranged under the discharge end of the table and the lower runs of the belts are supported by an idler roller 53 arranged under the table. This idler roller is supported by pivoted hangers 54 and one or more springs 55 are connected to the hangers and serve to hold the roller 53 yieldingly against the lower runs of the belts so as to hold the belts normally taut.

Arranged between the inclined walls 44 of the inclined portion of the table are ribs 56 having their side faces diverging downwardly, these ribs being interposed between the belts 51 and coöperating therewith to form parallel channels the bottoms of which are made up of the belts 51. The upper runs of the short belts 50 extend close to the upper ends of the ribs as will be apparent by referring to Fig. 4. The two sets of belts 50 and 51 form practically the entire bottom of the feed box 42.

A cross bar 57 is supported above the lower ends of the channels 58 which are formed between the ribs 56 and suspended from this cross bar is a series of spring loops 59, the lower portion of each loop being supported within the outlet end of one of the channels.

Brackets 60 are secured to the lower edges of the sides of the inclined portion of the table and are contacted by cams 61 secured to a rock shaft 62. This shaft extends transversely of the frame 1 and has an arm 63 extending radially from one end thereof and into the path of a tappet 64 extending inwardly from the gear 27. From the foregoing it will be seen that upon the completion of each revolution of gear 27, the tappet 64 will push upwardly on the arm 63 and rock shaft 62. Cams 61 will thus press upwardly against the brackets 60 and elevate the lower end of the spreading table. In order to prevent longitudinal displacement of the table relative to the frame 1, slotted guides 65 are extended upwardly from the frame 1 and are slidably engaged by the end portions of a cross rod 66 extending under and secured to the table.

The trays to be used in connection with the spreading apparatus are preferably formed with open ends, one of these trays being illustrated in Fig. 7. Each tray includes a bottom 67 and side strips 68. One end of the tray is adapted to be closed by means of an extensible cleat made up of alining strips 69 having sockets 70 in their inner ends for the reception of the end portions of a spring 71 which serves to hold the strips normally spread apart. A guide plate 72 is secured to one of the strips 69 and is slidably connected to the other strip.

In using the apparatus thus far described, the cleat is first placed in one end of a tray and said tray is then positioned on the upper runs of the chains 4 at the receiving end of the frame, certain of the ears or followers 10 bearing against the back end of the tray. The pawl and ratchet mechanism illustrated at 13, 38, 11 and 15 will operate to move the chains intermittently so as to shift the tray toward the discharge end of the apparatus. During this intermittent movement of the tray and chains, the gear 27 is slowly revolving and, as the front end of the tray reaches a point close to the front end of the table, the outermost portion of the cam 29 passes the roller 30 and spring 37 thus actuates arm 33 and ratchet wheel 34 so as to give a quick forward movement to the chains 4 and the tray thereon. The advancing end of the tray will thus be carried under the lower end of the table. Simultaneously with this movement, the cams 61 are elevated by the tappet 64 and arm 63 and the lower end of the table is thus raised so as to permit the front end of the tray to pass under the said end of the table. The table promptly moves back to its normal position after the tappet 64 has passed the arm 63. The tray is now in position with its advancing end slightly beyond the discharge end of the table. Fruit, which may have been discharged onto the belts 50 and 51 in the feed box 42 will be carried into the channels 58 and conveyed downwardly in said channels by the belts 51. As the walls of the channels converge downwardly it will be apparent that the pieces of fruit will assume positions with their convex faces lowermost and their flat or cut faces uppermost as said pieces travel within these channels. Should any of the pieces be mounted on edge or inverted with their flat faces lowermost, the spring loops 59, acting upon the pieces of fruit, will right the pieces as they pass out of the lower ends of the channels and fall onto the tray passing thereunder. The rod 15 is preferably connected to the arm 13 so that the throw of said arm and the consequent rotation of the ratchet wheel 11 will be such as to move the tray a distance equal to the diameter of the largest size pieces being spread. For instance if the pieces are two inches in diameter and under, the parts will be adjusted so that each movement of the ratchet wheel 11 will cause the tray to move forward two inches. Thus it will be seen that as pieces of fruit are discharged from the channels 58 and onto the tray so as to form a row across the tray, the said tray is moved forward by means of the mechanism referred to, thus leaving a space into which another row of fruit can be deposited. When the last row of fruit has been placed in the tray in this manner, the parts of the mechanism operate to first elevate the lower end of the table so as to lift the lower ends of the channels 58 out of the tray and then to release the spring drawn arm 33 so as to produce a quick forward movement of the upper runs of the chains 4 and a corresponding movement of the tray. The back end of the tray and the forward end of the next succeeding tray will thus be carried under the lower end of the table after which the said table will drop by gravity into the new tray brought into position thereunder. The filled tray can then be lifted out of the discharge end of the frame 1. It is to be understood that empty trays are to be supplied to the receiving end of the frame as fast as possible.

For the purpose of supplying cut fruits to the spreading table, distributing mechanism has been provided. This mechanism includes an elongated trough 73 mounted at one end within and fixedly connected to a yoke 74. This yoke has a stem 75 extending downwardly therefrom and mounted to rotate within a supporting structure not shown, and which can be part of a fruit cutting machine. This structure may form a part of a fruit cutter and pitter, not shown, or can constitute a portion of any other machine designed to bear fruit and supply it to the trough. A pulley 77 is journaled within the yoke 74 and extends into the upper or inlet end of the trough and another smaller pulley 78 is mounted at the outlet end of the trough. An endless belt 79 is mounted on the pulleys 77 and 78 and the upper run of the belt extends longitudinally within and constitutes the bottom of the trough. The trough is inclined downwardly toward and overhangs the feed box 42 and a cross strip 80 is secured within the upper portion of the outlet end of the trough and supports a spring loop 81 which extends downwardly close to the belt 79. Pulley 77 is secured to a shaft 82 journaled in suitable supports, not shown, and another pulley 83 is secured to this shaft and transmits motion, through a belt 84 to a pulley 85 secured to a shaft 86, said shaft being journaled in a standard 87 extending upwardly from the yoke 74. A pulley 88 is secured to and rotates with the shaft 86 and drives a belt 89 which, in turn, engages a pulley 90 secured to one end of a shaft 91. This shaft is arranged longitudinally along one side of the trough 73 and has a fan 92 secured thereto and the blades of which move successively into an opening 93 formed in one side of the trough. A pulley 94 is secured to the shaft 82 and receives motion, through a belt 95 from a pulley 96 which, in turn, is secured to a shaft 97. A pulley 98 is secured to this shaft 97 and receives motion, as through a cross belt 99, from a pulley 100 which is secured to a shaft 101. Another pulley 102 is secured to this shaft and receives motion, through a belt 103, from a pulley 104 on the drive shaft 25. A shaft 105 is journaled above the shaft 97 and has a pulley 106 secured thereto. This pulley receives motion, through a belt 107, from a pulley 108 secured to shaft 97. Disks 109 are secured to the end portions of the shaft 105 and each disk has a rod 110 pivotally connected to it and mounted within a guide 111 carried by a suitable supporting structure (not shown). Said rod extends through an eye 112 formed at one end of a connecting rod 113, there being springs 114 on the rod 110 and bearing against opposite faces of the eye 112, the said springs being held in place by means of pins 115 or the like. The connecting rods 113 have hooks 116 at their free ends and these hooks are adapted to engage arms 117 extending laterally from the trough 73. The rods 110 are connected to the disks 109 at diametrically opposed points, respectively so that, when the two disks 109 rotate in unison, the rods 110 and 113 at one side of the machine will be projected forwardly while the other rods are being retracted. Thus it will be seen that the trough 73 will be swung laterally, first to one side and then to the other, this movement being sufficient to cause the discharge end of the trough to travel from one side wall 43 to the other of the feed box 42.

It is to be understood that when the cut fruit is applied to the upper or inlet end of the trough 73, it will be moved downwardly within the trough by the belt 79 and, as each piece of fruit arrives opposite the rotating fan 92, one of the blades of the fan will strike the fruit and, if the flat or cut face of the piece of fruit is lowermost, the flat blade will engage said face and turn the piece of fruit so as to bring its convex face lowermost. If said convex face is lowermost when the fruit reaches the fan, said fan, upon contacting with the fruit will have no effect thereon. This has been found by actual practice. Should any pieces of fruit pass the fan without being properly righted, they will come into engagement with the spring loop 81 and this loop will tilt the pieces of fruit so as to bring their convex faces lowermost, the loop being slidably engaged by the flat face of the piece of fruit passing thereunder. Upon leaving the trough the fruit will be deposited on one or more of the belts 50 and 51 in the feed box and it is to be understood that during the passage of the fruit down the trough, said trough will be swung toward the two sides of the feed box successively, thus spreading the fruit transversely of the feed box. By providing the disks 109 and the parts operated thereby for oscillating the trough 73, it will be apparent that the trough will be held at each side of the feed box a sufficient length of time to permit two pieces of fruit to leave the trough before said trough begins its return movement. This is necessary in order that the fruit may be deposited in parallel rows, each row extending throughout the width of the feed box. The operation of conveying the cut fruit from the feed box and along the table to the trays has already been described.

Although ordinary strips of canvas or the like can be used in making the belts 50 and 51 as well as the belt 79, it is to be understood that if preferred these belts can be made of endless chains 118 having canvas 119 or the like secured to them. This last form of belt is desirable for the reason that ordinary canvas belts are liable to become slippery after long continued use because of the fruit juices deposited on them. By mounting the canvas strips on chains, however, this is prevented.

What is claimed is:—

1. A fruit spreader including a feed box, a channeled table inclined downwardly therefrom and fixedly connected thereto, and belts mounted for movement along the bottom of the feed box and longitudinally within the respective channels.

2. A fruit spreader including a feed box, an inclined channeled table extending therefrom and fixedly connected thereto, a plurality of endless belts extending along the bottom of the box and longitudinally within the respective channels, and means for simultaneously actuating the belts to move the upper runs thereof toward the lower end of the table.

3. A fruit spreader including a feed box, an inclined channeled table extending from the box, endless belts having their upper runs extending longitudinally within the channels and along the bottom of the box, means for simultaneously actuating the belts, and flexible elements adjacent the discharge ends of the channels.

4. A fruit spreader including an inclined longitudinally channeled table, endless belts movable longitudinally within the channels, means for simultaneously actuating the belts to convey pieces of fruit into the channels and longitudinally thereof, and flexible elements adjacent the discharge ends of the channels.

5. A fruit spreader including a table having parallel longitudinal channels, endless belts having upper runs movable longitudinally within and projecting beyond the feed ends of the channels, and endless belts interposed between said projecting portions and coöperating therewith to direct pieces of fruit into the channels.

6. A fruit spreader including a feed box, a table having parallel longitudinal channels, endless belts having their upper runs movable longitudinally within the feed box and channels, endless belts having their upper runs movable only in the feed box, and means for actuating the belts to direct pieces of fruit into the channels.

7. A fruit spreader including a tray supporting structure, means for shifting a tray longitudinally within the structure, a table inclined downwardly toward the path of the trays and having a plurality of channels, the walls of the channels constituting means for engaging fruit to hold it with its cut face uppermost and to prevent lateral rocking of the fruit, and endless means movable within the channels for conveying pieces of fruit to and longitudinally of the channels.

8. A fruit spreader including a tray supporting structure, means for shifting a tray longitudinally within the structure, a table inclined downwardly toward the path of the trays and having a plurality of channels each having walls for simultaneously engaging a piece of fruit to hold it with its cut or flat face uppermost and to prevent lateral rocking of the fruit, endless means movable within the channels for conveying pieces of fruit to and longitudinally of the channels, and means for automatically elevating the lower end of the channels during the passage of ends of the trays thereunder.

9. A fruit spreader including an inclined table having longitudinal channels each having walls for simultaneously engaging a piece of fruit to hold it with its cut or flat face uppermost and to prevent lateral rocking of the fruit, endless belts having their upper runs movable longitudinally within the channels, means for driving the belts, means for directing a tray under the delivery end of the table, and means for moving the table to elevate its delivery end out of the path of the trays.

10. A fruit spreader including an inclined table having longitudinal channels, endless belts having their upper runs movable longitudinally within the channels, means for driving the belts, means for directing a tray under the delivery end of the table, means for moving the table to elevate its delivery end out of the path of the trays, and means for accelerating the movement of the trays during the elevation of the table.

11. A fruit spreader including a feed box, a table extending downwardly therefrom and having longitudinal channels each having walls for simultaneously engaging a piece of fruit to hold it with its cut or flat face uppermost and to prevent lateral rocking of the fruit, endless belts having their upper runs extending along the upper surface of the bottom of the box, and longitudinally within the respective channels, endless belts having their upper runs between the other belts and only in the feed box, means for simultaneously actuating the belts, means for feeding trays under the delivery end of the table, and means for elevating the delivery end of the table.

12. The combination with a tray supporting structure, of means for conveying pieces of fruit to the trays with their cut or flat faces uppermost, and coöperating elements for positioning the pieces on the trays with the cut or flat faces uppermost.

13. The combination with an inclined table having longitudinal channels each having walls for simultaneously engaging a piece of fruit to hold it with its cut or flat face uppermost and to prevent lateral rocking of the fruit, and endless belts having their upper runs movably mounted within the channels, said belts constituting means for feeding pieces of fruit to and directing them longitudinally within the channels, of endless supports, means for actuating the same, and a tray movably mounted on the supports, said tray being movable under the table.

14. The combination with endless tray supports and means for intermittently actuating the same, of a feed table, endless means thereon for directing cut fruit onto the trays, lifting cams under said table, means for actuating the same to elevate the table while the end of a tray is passing thereunder, and mechanism for accelerating the movement of the tray supports while the table is elevated.

15. The combination with a movable tray supporting structure, of means for delivering rows of fruit to each tray, means for automatically elevating the discharge end of said delivering means during the passage of the end of a tray thereunder, and means for automatically accelerating the movement of the tray supporting structure during such elevation.

16. The combination with a tray supporting structure, of means for intermittently operating the same to move a tray in one direction, means for delivering rows of fruit to the tray during such movement, means for automatically elevating the discharge end of the delivering means during the passage of the end of a tray under said end, and means for accelerating the movement of the tray supporting structure during such elevation.

17. Apparatus of the class described including an inclined longitudinally channeled spreading table, means movable longitudinally within the channels for conveying fruit, a tray supporting device movable under the discharge end of the table, and yieldable retarding devices suspended above the discharge ends of the channels and coöperating with the walls of the channels for positioning fruits with their cut or flat faces uppermost while discharging onto a tray.

18. A fruit spreader including an inclined table having longitudinal channels, endless members having their upper runs movable longitudinally within the channels, means for driving said members, means for directing a tray under the delivery end of the table, and means for varying the distance between the discharge end of the table and the bottom of the tray to allow the passage of the wall of the tray under said discharge end.

19. A fruit spreader including an inclined table having longitudinal channels, endless members having their upper runs movable longitudinally within the channels, means for driving said members, means for directing a tray under the delivery end of the table, means for varying the distance between the discharge end of the table and the bottom of the tray to allow the passage of the wall of the tray under said discharge end, and means for accelerating the movement of the tray during the passage of its wall under said discharge end.

20. A fruit spreader including an inclined longitudinally channeled table, endless belts having their upper runs extending longitudinally within the channels, means for simultaneously actuating the belts, and flexible elements extending to the discharge ends of the channels.

In testimony that I claim the foregoing as my own, I have hereto affixed my signature in the presence of two witnesses.

GEORGE WILLIAM ALLEN.

Witnesses:
N. LINDSAY SOUTH,
L. L. MADDEN.